(12) United States Patent
Kondor et al.

(10) Patent No.: US 9,829,036 B2
(45) Date of Patent: Nov. 28, 2017

(54) THRUST BEARING AND COMPRESSED AIR SHOCK ABSORBER

(71) Applicant: Anvis Deutschland GmbH, Steinau an der Straße (DE)

(72) Inventors: Josef Kondor, Steinau an der Straße (DE); Daniela Hadwiger, Steinau an der Straße (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 0 days.

(21) Appl. No.: 15/183,024

(22) Filed: Jun. 15, 2016

(65) Prior Publication Data

US 2016/0369839 A1 Dec. 22, 2016

(30) Foreign Application Priority Data

Jun. 17, 2015 (DE) .......................... 10 2015 007 743

(51) Int. Cl.
| | |
|---|---|
| *B60G 13/00* | (2006.01) |
| *F16C 17/04* | (2006.01) |
| *F16F 9/36* | (2006.01) |
| *F16F 9/54* | (2006.01) |
| *F16F 1/38* | (2006.01) |

(52) U.S. Cl.
CPC ............ *F16C 17/04* (2013.01); *B60G 13/003* (2013.01); *F16F 1/3863* (2013.01); *F16F 9/36* (2013.01); *F16F 9/54* (2013.01); *B60G 2204/128* (2013.01); *B60G 2204/41* (2013.01); *F16C 2240/60* (2013.01); *F16C 2361/53* (2013.01)

(58) Field of Classification Search
CPC .... F16C 17/04; F16C 9/06; F16C 9/36; F16C 2240/60
USPC ................. 267/140.11–140.13, 140.2–140.4, 267/141.1–141.7, 219, 220, 221
See application file for complete search history.

(56) References Cited

U.S. PATENT DOCUMENTS

| | | | | |
|---|---|---|---|---|
| 3,165,306 | A | * | 1/1965 | Tea ....................... B60G 15/065 |
| | | | | 267/220 |
| 4,022,448 | A | * | 5/1977 | Reeder .................... F16F 9/084 |
| | | | | 188/269 |
| 4,161,304 | A | | 7/1979 | Brenner et al. |
| 4,416,445 | A | | 11/1983 | Coad |
| 4,616,811 | A | * | 10/1986 | Buma .................... B60G 17/04 |
| | | | | 267/220 |
| 4,828,232 | A | * | 5/1989 | Harrod ..................... F16F 9/58 |
| | | | | 188/322.12 |
| 4,911,416 | A | * | 3/1990 | Warmuth, II ........ B60G 13/001 |
| | | | | 267/122 |

(Continued)

*Primary Examiner* — Christopher Schwartz
(74) *Attorney, Agent, or Firm* — Armstrong Teasdale LLP (57) ABSTRACT

A thrust bearing for a compressed air shock absorber is provided. The thrust bearing includes an inner sleeve, an outer sleeve, and an elastomer body connected to the inner sleeve and the outer sleeve and ending in a compressed air chamber of the air shock absorber, wherein the elastomer body is designed as a conical spring that extends between an inner sleeve connection area from the inner sleeve and an outer sleeve connection area from the inner sleeve, and wherein at least one of the inner sleeve and the outer sleeve near an axial end section of the inner sleeve connection area and the outer sleeve connection area, respectively, has a radial projecting support edge for bracing of the elastomer body in the axial direction.

20 Claims, 4 Drawing Sheets

(56) References Cited

U.S. PATENT DOCUMENTS

| | | | | |
|---|---|---|---|---|
| 5,096,166 | A | * | 3/1992 | Schwerdt ............ F16F 13/1418 267/140.12 |
| 5,678,810 | A | * | 10/1997 | Summers, III ..... B60G 17/0521 267/220 |
| 6,666,311 | B1 | * | 12/2003 | Schutz ................. B60G 15/067 188/321.11 |
| 9,132,709 | B2 | * | 9/2015 | Endo ....................... B60G 15/06 |
| 2002/0145242 | A1 | * | 10/2002 | Miyamoto ........... B60G 13/003 267/220 |
| 2003/0127788 | A1 | * | 7/2003 | Graeve ................ B60G 13/003 267/219 |
| 2012/0049428 | A1 | * | 3/2012 | Moore ................. B60G 15/068 267/220 |
| 2014/0070471 | A1 | * | 3/2014 | Wilson .................. B60G 11/22 267/292 |

\* cited by examiner

THRUST BEARING AND COMPRESSED AIR SHOCK ABSORBER

CROSS REFERENCE TO RELATED APPLICATIONS

This application claims the benefits of DE Patent Application No. 10 2015 007 743.0 filed Jun. 17, 2015, which is hereby incorporated by reference in its entirety.

BACKGROUND

The present invention relates to a thrust bearing for compressed air shock absorbers and a compressed air shock absorber.

Suspension struts are used in vehicles for cushioning in uneven terrain and dampening the oscillation and/or vibrations caused by uneven terrain. With the suspension struts, the damping rod extends through the air spring compartment of the air spring bellows, and the pneumatic air space is limited and sealed by means of a damper-head bearing or damper-head seal. The connection of the suspension strut to the vehicle body takes place via the damper-head bearing.

The function of the damper-head bearing is to seal the air spring compartment hermetically, specifically in the area where the piston rod passes through the spring head flange, while simultaneously absorbing axial and radial forces from the damping rod and conducting it to the vehicle body via the damper head mounting. Here elastomer components are used in the damper head mounting.

The sealing function can be integrated into the into the damper head mounting, i.e. the damping rod bracing and the seal may be realized in one single piece. With this concept, however, the required design strongly influences the bearing characteristics due to the air pressure existing in the suspension strut, deviating strongly due to the driving conditions, which is not advantageous.

In the alternative, the sealing function may be realized primarily by a thrust bearing in front or behind the actual support bearing (axial bearing); however, due to the high air pressure to be sealed (up to more than 20 bar) they show a high radial stiffness. Due to the high radial stiffness of the thrust bearing, the arrangement of the thrust bearing in the system can create transverse forces onto the rod of the shock absorber with gimballed stresses. Thus, not only are the dampening characteristics of the absorber negatively influenced but also its endurance characteristics will be reduced.

BRIEF DESCRIPTION

The systems and methods described herein provide a thrust bearing for a compressed air shock absorber which will suitably seal the air spring compartment, specifically hermetically, while showing a small radial stiffness, as well as to provide an improved compressed air shock absorber with such a thrust bearing.

According to one aspect, a thrust bearing will be provided for a compressed air shock absorber. The thrust bearing includes an interior sleeve, an exterior sleeve, and an elastomer body connecting the interior sleeve and the exterior sleeve which is configured to limit a compressed air space of the shock absorber. The elastomer body is formed as a conical spring extending between an interior sleeve connection area of the interior sleeve and an exterior connection area of the exterior sleeve. The interior sleeve and/or exterior sleeve shows at and/or close to the axial abutment of the interior sleeve connection area and/or the exterior sleeve connection area a radial support projection to support the elastomer body in the axial direction.

Specifically, the thrust bearing is a thrust bearing for a damper head mounting and/or damper head seal of a compressed air shock absorber and/or suspension strut. The thrust bearing can be of annular design so that the damper head mounting can be arranged between the damping rod of the shock absorber and a bearing housing and/or bearing cover of the damper head mounting (mounted condition) and radial forces can be passed on from the damping rod to the bearing housing either springy or dampened. The size of the thrust bearing is not limited and is dependent on the size of the compressed air shock absorber. For example, the thrust bearing can have an axial length of approximately 40 mm to approximately 60 mm. However, bigger axial lengths are possible as well. The diameter of the thrust bearing can be approximately 45 mm to approximately 75 mm, for example.

The interior sleeve can essentially have a cylindrical form, with the interior diameter of the interior sleeve being of a large enough dimension that a section of the damping rod intended for it being able to be directed through the interior sleeve. If the interior sleeve has a support projection, the form in the area of the support projection may deviate from the cylindrical form. Specifically, the exterior diameter of the interior sleeve can increase continually and/or incrementally towards an axial end of the interior sleeve. In the area of the radial support projection, the interior diameter of the interior sleeve can be constant. Specifically, the interior sleeve has the function of introducing the radial forces evenly from the damping rod into the elastomer body. The interior sleeve may provide the required axial stiffness of the thrust bearing so that it can be braced and/or clamped between an interior sleeve of an axial bearing and a supporting edge in order to conduct axial forces from the damping rod essentially in an unsuspended and/or undampened manner. Therefore, the interior sleeve may be formed of metal, especially of high-tensile steel. In addition, the interior sleeve may extend essentially across the entire axial length of the thrust bearing, and/or the axial front surfaces of the interior sleeve may be free of any additional material (specifically elastomer). In order to improve the sealing function, however, elastomer material can be provided along the entire axial front surface of the interior sleeve, specifically molded to it. The interior sleeve can have a material strength of approximately 1.5 to 10 mm, more particularly a material strength of approximately 2 mm to approximately 8 mm, and even more particularly a material strength of approximately 2 mm to approximately 6 mm.

The interior surface of the interior sleeve can be formed in such a way to fit to the outside of the damping rod directly, or with elastomer material in between. The interior surface of the interior sleeve can be free of elastomer material. The interior surface of the interior sleeve can have an area to receive an O-ring, such as a wraparound groove, specifically when there is no gasket geometry along the interior sleeve.

The exterior sleeve can be essentially cylindrical at least in part, with the exterior sleeve essentially coaxially arranged to the interior sleeve. If the exterior sleeve contains a supporting edge, the form deviates from the cylindrical form in the area of the supporting edge. Specifically, the exterior sleeve functions to conduct the radial forces from the interior sleeve equally to the bearing housing via the elastomer body. In addition, the exterior sleeve can contribute to the axial stiffness of the thrust bearing. The stiffness requirements for the exterior sleeve are not as high as with the interior sleeve so that aluminum or even plastic can be used as material in order to save expenses. The exterior sleeve can have a material strength of approximately 1 to approximately 4 mm, more particularly a material strength of approximately 1 mm to approximately 3 mm, and even more particularly a material strength of approximately 1.5 mm to approximately 2.5 mm.

The exterior surface of the exterior sleeve can be formed in such a way to fit directly to an interior wall of the bearing housing or with elastomer material in between. The exterior surface of the exterior housing can be covered partially or completely with elastomer material, with this elastomer material being able to form a gasket geometry. However, the exterior surface of the exterior sleeve can also be free of any material of the elastomer body. The axial surface area of the exterior sleeve can have a wraparound sealing lip of elastomer material. The exterior surface of the exterior sleeve can have an area to receive an O-ring, such as a wraparound groove, specifically when there is no gasket geometry or sealing lip along the exterior sleeve.

The elastomer body extends at least between the interior sleeve and the exterior sleeve and specifically connects them in a springy and/or damping manner. In addition, the elastomer body limits the shock absorber space that contains compressed air and/or can be filled with compressed air and/or seals it hermetically from the surroundings (the surrounding pressure). The compressed air space of the shock absorber can be the air spring compartment of an air spring and/or suspension strut. The thrust bearing can be created by molding the elastomer body around and/or to the interior sleeve and/or exterior sleeve, specifically in one combined tool. Here the sealing lips and/or sealant geometries can be overmoulded and/or injected with elastomer material together with the elastomer body.

The elastomer body is designed as a conical spring extending between the interior sleeve connection area of the interior sleeve and the exterior sleeve connection area of the exterior sleeve. The conical spring essentially is formed as a hollow cone or truncated cone. The exterior diameter and/or interior diameter of the conical spring may decrease in the direction of the tip. In the area of the broad base, the conical spring is connected with the exterior sleeve and in the area of the tip the conical spring is connected with the interior sleeve. The connection area of the interior sleeve with the conical spring is the interior sleeve connection area, which extends circumferentially along the interior surface of the exterior sleeve.

The axial length of the conical spring may be smaller or equal to the axial Length of the exterior sleeve, so that the conical spring can be placed completely within the thrust bearing and/or the exterior sleeve. For this, the exterior sleeve connection area can be arranged higher than the interior sleeve connection area. The conical sleeve correspondingly can be arranged in a widening manner (tip towards the bottom).

When notations regarding directions or positions are used in this description or in the claims, such as "higher", "lower", at the top", "at the bottom" or similar, they refer to the thrust bearing mounted in the condition as intended. In the mounted condition as intended, the damping rod extends essentially from the damping cylinder toward the top and through the interior sleeve of the thrust bearing with the compressed air space and/or air spring space is arranged under the thrust bearing. The lower axial end of the thrust bearing is thus facing the air spring compartment and the upper axial end of the thrust bearing is facing away from the air spring compartment.

The interior sleeve and/or exterior sleeve has a radial support projection on or near an axial abutment of the interior sleeve connection area and/or the exterior sleeve connection area for the axial support of the elastomer body. A radial projection means that the support projection extends in a radial direction into the space between the interior sleeve and the exterior sleeve. Here the support projection can extend radially into the elastomer body at least in part. The interior sleeve connection area and/or exterior sleeve connection area can be arranged at least in part on the support projection. The support projection can be formed at least in part outside of the interior sleeve connection area. The support projection is arranged relative to the elastomer body, i.e. to the interior sleeve connection area and/or the exterior sleeve connection area, so that an axial support of the elastomer body can be guaranteed. For this, the support projection is formed on or near an (upper or lower) axial abutment of the interior sleeve connection area and/or the exterior sleeve connection area.

The support projection may be formed as one piece with the interior sleeve and/or the exterior sleeve and can be machined, for example. For an equal transfer of force, the support projection can have a bent and/or slanted and/or concave cross section in the area of the interior sleeve connecting area and/or the exterior sleeve connecting area. However, the support projection can also be partially convex in the area of the interior sleeve projection area. Specifically, the area of the interior sleeve connection area and/or exterior sleeve connecting area can be aligned in the area of the support projection at least in sections essentially vertically or at a steep angle (e.g. at an angle of approximately 90° to approximately 60°) to the extension direction (approach direction) of the conical spring wall. Specifically the extension direction of the conical spring wall refers to the mid-extension direction of the conical spring wall in a sectional plane through the symmetrical axis of the conical spring. Thus, the extension direction of the conical spring wall extends in a sectional plane through the symmetrical axis of the conical spring specifically from the center of the interior sleeve connection area to the center of the exterior sleeve connection area.

With the support of the elastomer body by means of the support projection, a shift of the elastomer body in an axial direction is at least partially avoided and/or made more difficult, specifically when pressure is applied.

With the design of the elastomer body as a conical spring, the radial stiffness of the elastomer body can be noticeably decreased, and a good rotation of the interior sleeve in comparison to the exterior sleeve can be created. However, with a decrease in material thickness and/or material stiffness of the conical spring a so-called balloon effect is created due to the high pressures in the air spring compartment, specifically at peak loads while driving, where the elastomer wall of the conical spring inflates and can pop. With the support projection the target for the air pressure can be reduced in an axial direction, and a shift of the elastomer body, specifically the inflation of it, can effectively be avoided. The support projection can be formed in such a way that the elastomer body and/or the conical spring is only pressed against the interior sleeve in the air spring compartment at peak loads by the air pressure.

Thus, an advantage of the support projection is that thrust bearings with very small radial stiffness can be provided since conical springs with small material thickness and/or small material stiffness can be provided. With the small radial stiffness of the thrust bearings the shear forces from the thrust bearing affecting the damping rod can be reduced which leads to better damping characteristics and a longer lifespan of the shock absorber. In addition, the thrust bearing can better adjust to the movements of the damping rod due to the smaller radial stiffness, so that a better seal of the air spring compartment is guaranteed.

An additional advantage in forming the elastomer body as a conical spring is that the axial stiffness can be adjusted through the geometry (i.e. length, thickness, alignment angle) and the material stiffness (rubber hardness) without significantly changing the radial stiffness, specifically without significantly increasing the radial stiffness.

The support projection may be essentially arranged as a wraparound along the interior sleeve and/or the exterior sleeve.

The cross section contour of the support projection along the circumference of the interior sleeve and/or the exterior sleeve may be essentially constant. However, the support projection can also be arranged only in sections along the circumference of the interior sleeve and/or the exterior sleeve as long as the support function is guaranteed.

The support projection may be formed on one of the upper axial abutments of the interior sleeve connection areas and/or the exterior sleeve connection areas.

With the arrangement of the supporting projection on one of the upper axial abutments of the interior sleeve connecting area and/or the exterior sleeve connecting area, an optimal axial support of the elastomer body against the air pressure from below (from the air spring compartment) can be guaranteed.

The support projection may be formed on one of the axial abutments of the interior sleeve and/or the exterior sleeve.

With the arrangement of the support projection on one of the axial abutments of the interior sleeve and/or the exterior sleeve the space within the thrust bearing (between the interior sleeve and the exterior sleeve) can be used in an optimal manner so that a compact thrust bearing can be created. The support projection may be formed along one of the upper axial abutments of the interior sleeve and/or the exterior sleeve. The arrangement of the support projection along the upper axial abutment provides for an expanded upper axial front surface of the interior sleeve and/or the exterior sleeve, which can serve very well as a sealing surface. To improve the sealing function, an elastomer layer and/or sealing lip can be arranged along the expanded upper axial front surface.

The elastomer body may be formed as a conical spring, which expands towards the top, with the support projection being formed along one of the upper axial abutments of the exterior sleeve.

The arrangement of the conical sleeve expanding towards the top (the broad base of the conical spring points towards the top, away from the air spring compartment, and the tip of the conical spring points towards the bottom) in combination with the support projection along the upper axial abutment of the exterior sleeve is especially advantageous since the wall of the conical spring can be directed towards the interior sleeve during high air pressure in the air spring compartment due to the support projection, where it can support itself well. With this, any damage to the conical spring and thus to the thrust bearing, specifically a burst, can be avoided even more effectively.

The thrust bearing may have a radial stiffness between approximately 10 N/mm to approximately 100 N/mm, and more particularly between approximately 30 N/mm and 60 N/mm. The axial stiffness of the thrust bearing can be between approximately 20 N/mm and approximately 200 N/mm, and more particularly between approximately 70 N/mm and approximately 130 N/mm.

Due to the especially low radial stiffness, it is possible to have the beneficial effects already described, with this being possible by providing the support projection even with air pressure in the air spring compartment of up to 20 bar or more, without any danger of damaging the thrust bearing.

The radial projection amount and/or radial projection length of the supporting edge is between approximately ⅓ to approximately ⅗ of the radial distance between the interior sleeve and the exterior sleeve, and more particularly approximately half of the radial distance between the interior sleeve and the exterior sleeve.

The radial projection amount of the supporting edge describes the length and/or height of the support projection vertically to the cylindrical interior surface of the exterior sleeve or to the cylindrical exterior surface of the interior sleeve. The radial projection amount may be configured in such a way that a sufficient support function allows that a sufficiently large radial relative motion between interior sleeve and exterior sleeve continues to be possible without the support projection getting in contact with the opposite sleeve. If a support projection is formed on the interior sleeve as well as on the exterior sleeve, they will not get in contact with each other during a relative motion between the interior sleeve and the exterior sleeve since they are formed at different heights in the axial direction due to the form of the conical spring.

The material strength of the interior sleeve and/or the exterior sleeve may be between approximately ⅕ and approximately ⅓ of the difference between the interior radius of the interior sleeve and the exterior radius of the exterior sleeve, and more particularly approximately ¼ of the difference between the interior radius of the interior sleeve and the exterior radius of the exterior sleeve.

The material strength of the interior sleeve and exterior sleeve will may be selected in such a way that there will be as small a surface as possible for the air pressure onto the elastomer body, but still with a sufficiently large radial relative motion possible between the interior sleeve and the exterior sleeve, without the wall of the conical spring being wedged from both sides by the interior sleeve and the exterior sleeve and any further relative motion being hindered.

The area of the interior sleeve connection area may be approximately equal to the area of the exterior sleeve connection area.

By adjusting the area of the interior sleeve connection area approximately equal to the area of the exterior sleeve connection area, the flow of the force in the conical spring is even. The conical spring can be adjusted here with only a small amount of material and with a high life expectancy.

The interior sleeve and/or the exterior sleeve may have a sealing lip, which may be arranged on an axial front surface of the interior sleeve and/or the exterior sleeve.

The sealing lip can be formed together with the elastomer body in one tool by injection moulding of the interior sleeve and/or the exterior sleeve. The sealing lip may be arranged along the upper axial front surface of the exterior sleeve.

According to another aspect, a compressed air shock absorber is provided. The compressed air shock absorber includes an air spring bellows, which limits an air spring compartment at least partially, a damper head mounting to seal the air spring compartment to the environment, and a damping unit showing a damping rod, with the damper head mounting having a thrust bearing described above, and with the damping rod extending through the interior sleeve of the thrust bearing.

BRIEF DESCRIPTION OF THE DRAWINGS

In the following, the embodiments of the disclosure will be described more thoroughly through accompanying drawings. It is to be understood that individual features of the design executions may be combined with further design executions. The following will be displayed.

DETAILED DESCRIPTION

Figure 1:
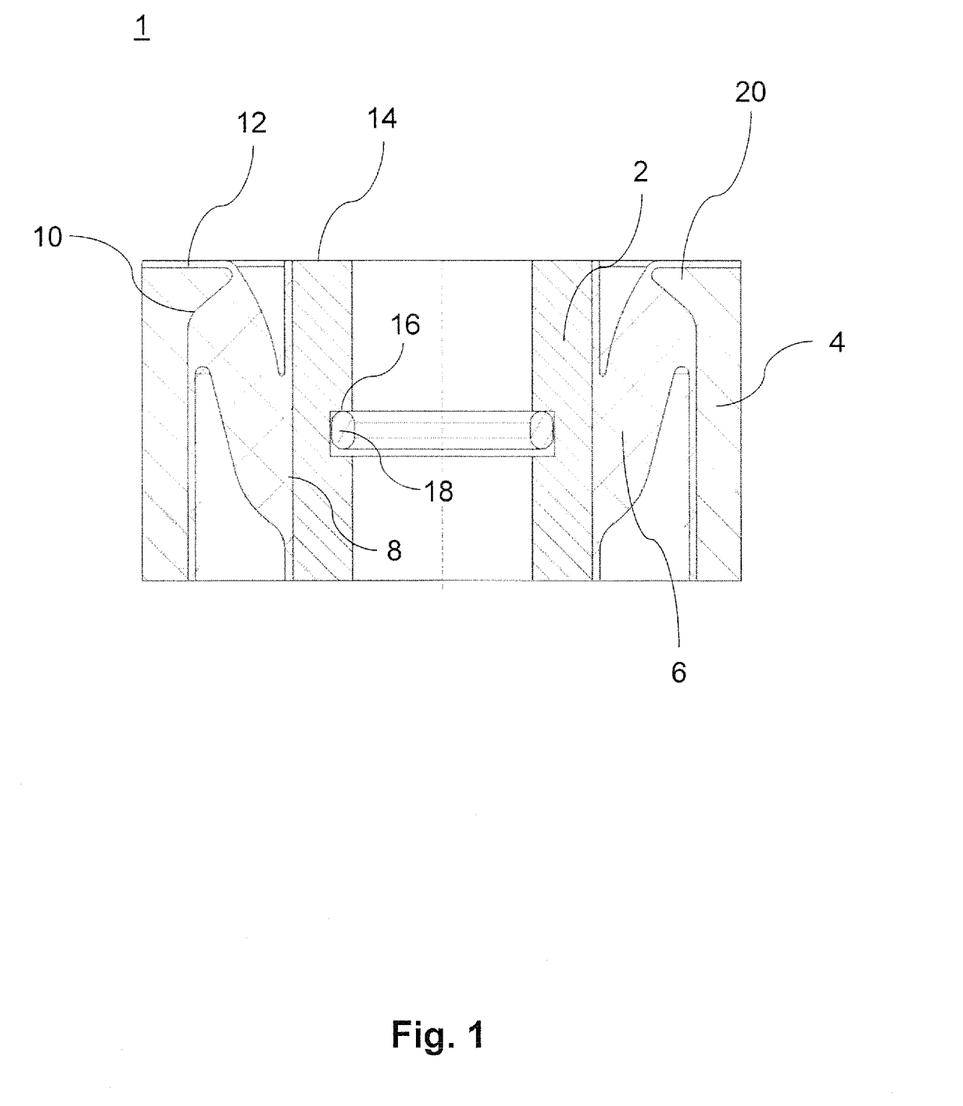
FIG. 1 is a view of a thrust bearing according to a first embodiment.

FIG. 1 shows a view of a thrust bearing according to a first embodiment. The thrust bearing 1 is essentially ring shaped and axially symmetrically designed, and the figures at the same time show a cut through the symmetrical axis of the thrust bearing 1. The thrust bearing 1 essentially shows a cylindrical inner sleeve 2 as well as a generally cylindrically designed outer sleeve 4 on it. The inner sleeve 2 is connected with the outer sleeve 4 over an elastomer body 6.

The elastomer body 6 is designed as a conical spring and stretches between the inner sleeve connection area 8 of the inner sleeve 2 and the outer sleeve connection area 10 of the outer sleeve 4. The conical spring is designed to lessen or increase pressure between the damping rod and the housing of the bearing over the inner sleeve 2 and the outer sleeve 4. Through the activation of the various attributes of the conical spring, such things as its length, thickness, placement angle and/or the stiffness of the material of the conical spring can be changed. In the embodiment shown, the conical spring is arranged expanded toward the top; this means that the broad base of the conical spring is turned away from the air pressure sealing compartment, respectively, the air spring compartment, and the tip of the conical spring is turned toward the air spring compartment.

The inner sleeve 2 portrayed in the first embodiment is generally designed over the entire axial length of the thrust bearing 1 and, on both axial ends, features exposed front face. The front face turned toward the air pressure sealing compartment is supported by being mounted on a supporting edge of the damping rod. In the forming of a bracing edge, the corresponding axial ends of the inner sleeve 2 have the radial, inward section previously presented.

The outer faces of the inner sleeve 2 can be covered completely with elastomer material, as well as the sealing area of the inner sleeve. This elastomer material can be designed in conjunction with the elastomer body 6. In a similar manner, the inner faces of the outer sleeve 4 can be completely covered with elastomer material, as well as the outer sleeve sealing area, whereby, this elastomer material can be formed together with elastomer body 6.

In the embodiment shown, the upper axial front face of the outer sleeve 4 likewise is at least partially covered with elastomer material, and it builds up an outer sleeve sealing surface 12. The outer sleeve sealing surface 12 in its mounted state comes in contact with a corresponding sealing surface of the bearing housing. In a similar manner, the upper axial inner face of the inner sleeve 2 can have an inner sleeve sealing surface 14 designed, through which this is conditioned on the support area. The arrangement of the sealing surface(s) on the upper axial front faces of the outer sleeve, as well as the inner sleeve, has the advantage that the pressure of the air pressure from the air spring compartment (from underneath) from the air pressure resulting from the thrust bearing 1 presses upward and through this the sealing is strengthened. In the embodiment shown, the inner sleeve 2 has about a middle axial height on the inner side of a recessed sealing ring operation 16, which is shown through a section of an increased inner diameter. The sealing ring recess 16 depicted of the type that a running sealing system, for example an O-ring 18, can be set firmly in place in relationship to the significant cylindrical inner faces of the inner sleeve 2, heading radial inward. In the case the upper axial front faces the inner sleeve 2, as the inner sleeve sealing area 14 is shown, the sealing ring recess 16 and the O-ring 18 can be omitted.

On the upper axial end section, especially the end area of the outer sleeve there is at the least a partial wrap around, radial pointed inward protruding supporting leading edge 20 shown. A part of the outer sleeve sealing area 10 is placed on a section of the support edge 20. In other words, the support edge 20 is placed on the upper end section of the outer sealing area 10. The support edge 20 is configured to support the elastomer body 6 in an axial direction, especially if the air pressure in the air spring chamber (from underneath) is affecting the wall of the conical spring. Through the support edge 20 an inflation of the conical spring wall is avoided (Balloon effect.) Even more, through the support edge 20 the conical spring wall is directed against the outer wall of the inner sleeve 2 in the case of high air pressure, especially deflected to where the conical spring wall can support itself. Further more, through the placement of the support edge 20 on the upper axial end section of the outer sleeve 4 the outer sealing area 12 becomes larger, which improves the sealing.

Figure 2:
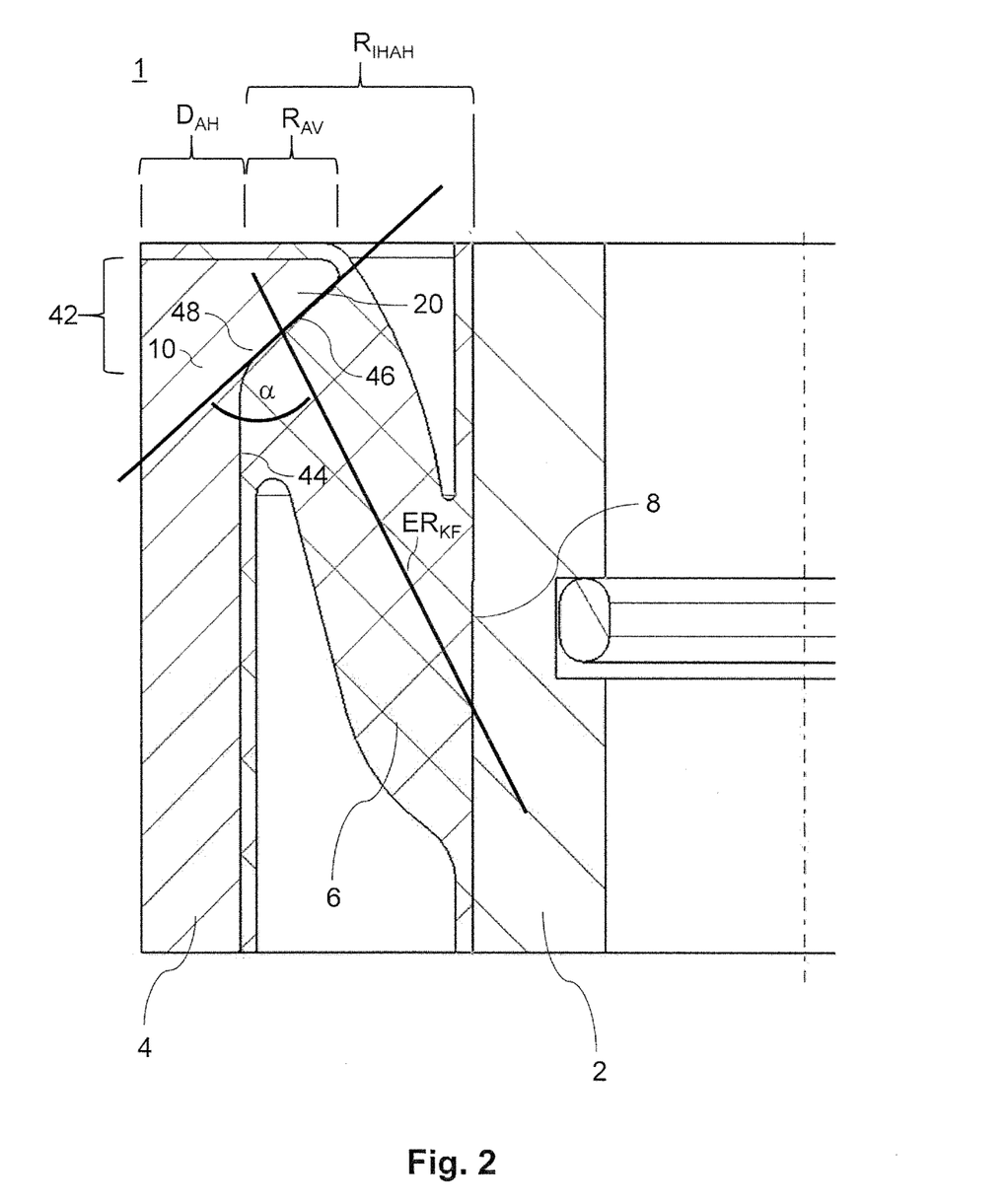
FIG. 2 is an enlarged view of the thrust bearing from FIG. 1.

FIG. 2 shows an enlarged sectional view of the of the thrust bearing from FIG. 1, giving a closer view of the configuration of the support edge 20, as described.

The support edge 20 is shown on the upper axial end section 42 of the outer sleeve. By the axial end section is referred to the area on the axial end of the sleeve. The axial end section can have an axial length, which approximately means the radial amount of the projection especially the length of the projection RAV of the support projection 20 the material thickness DAH of the outer sleeve 4. The amount of the projection RAV is measured against the radial height of the important cylindrical sections of the inner surface of the outer sleeve 4. The amount of the projection RAV can somewhat be compensated for through the thickness of the material DAH. The projection amount RAV can, however, also, for example, account for 0.5 to 2 times the thickness of the material DAH. The amount of the projection RAV can especially compensate for between approximately ⅓ to approximately ⅗ of the radial distance RIHAH between the inner sleeve 2 and the outer sleeve 4, for example compensate for approximately half the RIHAH.

The support projection 20 is further more shown on the upper axial end section of the outer sleeve sealing area 10, whereby the axial end section can include half or more of the entire axial length of the outer sleeve sealing area 10. The inner sleeve sealing area 8 is mainly placed vertically and/or cylindrically, because the inner sleeve 2 has no support edge according to this manner of production. Counter to this, the outer sleeve sealing area 10 is next to a vertical cylindrical section 44 especially a tilted section 46 whereby between the vertical 44 and the tilted section 46 a generally curved section 48 is shown.

The tilted 46 and the curved section 48 are ideal for the projection support 20. In other words, the support projection 20 (in the cross section) has a tilted section 46 and a curved section 48. In order to obtain the best support of the elastomer body 6 the tilted section 46 of the support projection 20 is placed or especially arranged at a steep angle α to the axial direction ERKF of the conical spring wall. With the axial placement ERKF of the conical wall, the axial placement is in a section plane through the symmetry axis of the conical spring, meaning at right angles to the thickness of the wall of the conical spring wall. The angle α can, for example, be between about 60° and about 90°, in spite of which, the smallest angle is to be measured. The support projection 20, however, must not necessarily have a true linear tilted section 46 and the cross sectional shape can be curved to the tips of the support projection 20 (especially, go through it) as long as the support projection 20 at least cross sectionally is directed or especially placed at a steep angle α to the axial direction ERKF of the conical spring wall.

The sides turned toward the elastomer body 6, especially the conical spring wall, especially the faces of the support projection 20 can be formed as previously described. On the other hand, the sides turned toward the elastomer body 6 especially sides turned away from the conical spring wall, especially the faces of the support projection 20, as well as the outer sleeve sealing area 10, can in the essential planes be formed separately and/or be completed together with the essential planes of the axial plane front faces of the outer sleeve 4.

Figure 3:
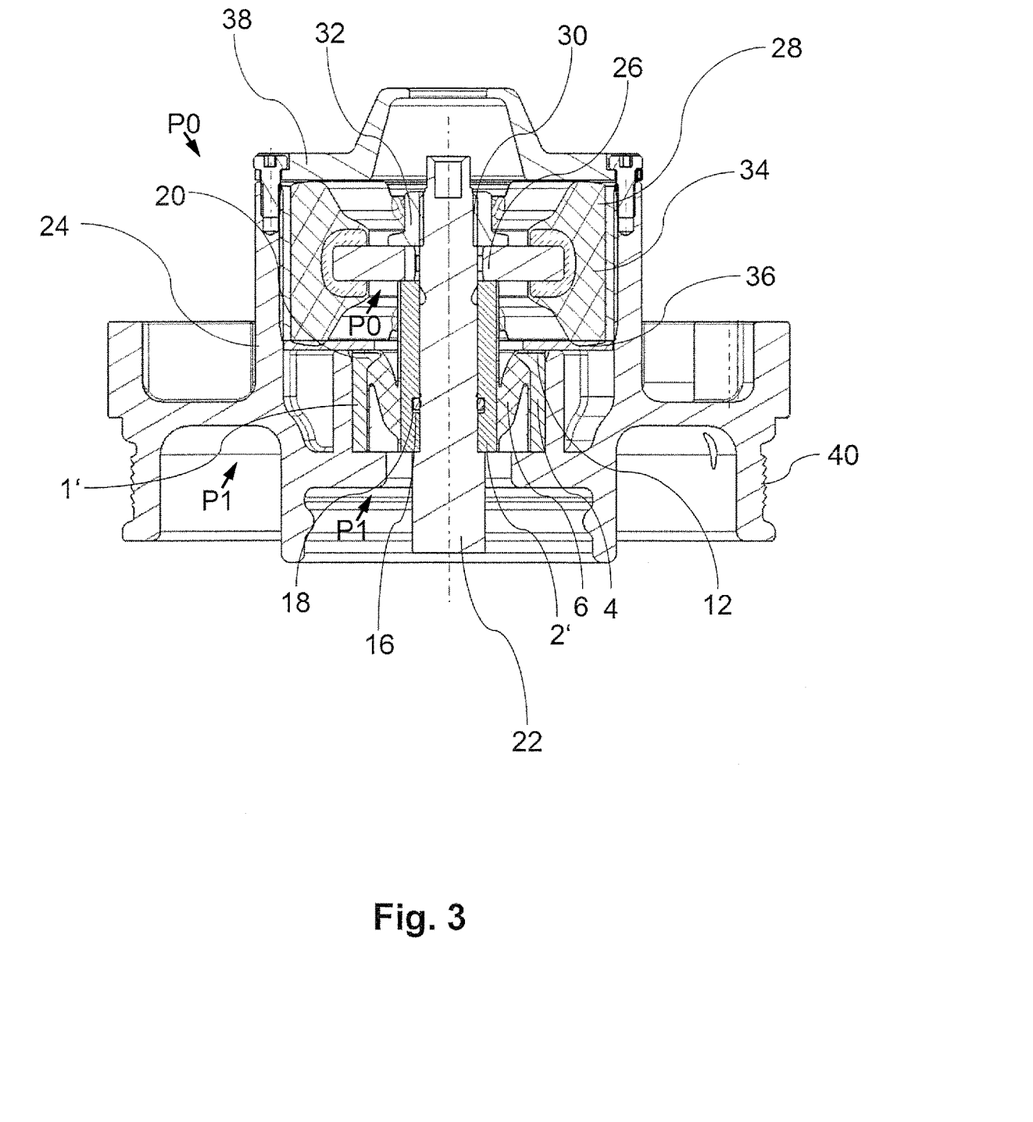
FIG. 3 is view of a thrust bearing according to a second embodiment in the mounted state on a damping rod and in a bearing housing.

FIG. 3 shows a thrust bearing 1' in accordance with a second embodiment in the mounted condition on a damping rod 22 and in bearing housing 24. In the mounted condition, the damping rod 22 passes through the inner, the important cylindrical recess of the thrust bearing 1', and the support ledge of the inner sleeve 2' lies on the support edge of the damping rod 22. The thrust bearing 1' is in the mounted condition as well as directed into an important cylindrical recess of the bearing housing 24. The thrust bearing 1' according to the second embodiment differs from the thrust bearing 1 of the first embodiment in that the inner sleeve 2' in the second design form is shaped in the axial direction to be longer than the outer sleeve 4, and protrudes toward the top. The inner sleeve 2' is clamped, or rather fixed between the support edge of the damping rod 22 and an inner sleeve 26 of an axial bearing 28 (support bearing). The damping rod is fixed to the inner, generally cylindrical recess of the inner sleeve 26 of the axial bearing 28. Through the axial lengthened inner sleeve 2' of the thrust bearing 1' the axial length of the inner sleeve 26 of the axial bearing 28 can be shortened. On an end section of the damping rod 22 a threaded section 30 has been formed so that the inner sleeve 26 of axial bearing 28 and the inner sleeve 2' of the thrust bearing 1' are clamped or can be fastened between a nut 32 and the support edge of the damping rod 22.

On the inner sleeve 26 of the axial bearing 28 an axial elastomer body 34 has been used, which connects the inner sleeve 26 of the axial bearing 28 to the bearing housing 24. The axial elastomer body 34 has the function of increasing and/or damping the axial power of the damping rod 22 over the inner sleeve 26 and leading it to the bearing housing 24. The axial elastomer body 34 is arranged in an axial contact area 36 of the bearing housing 24, and a covering element 38 of the of the bearing housing 24. Through the clamping of both inner sleeves through the use of the nut 32, the damper head bearing is attached to the damping rod 22.

The bearing housing 24 has, with the impact of the pressurized air compartment, the air spring compartment P1 facing axial ends from a mounting section 40 for the mounting of an air spring bellows (not shown.) The sealing lip, especially the outer sleeve sealing area 12 and the O-Ring 18 in the sealing ring recess 16 seal off the pressurized air compartment P1 inside of the bearing housing 24 and the air spring bellows from the surrounding environment (from the surrounding pressure) P0. In the pressurized air compartment P1, a stroke body can be used (not shown) which, in an area of the bearing housing 24, is clamped to the axial ends of the thrust bearing 1' facing the pressurized air compartment P1.

Figure 4:
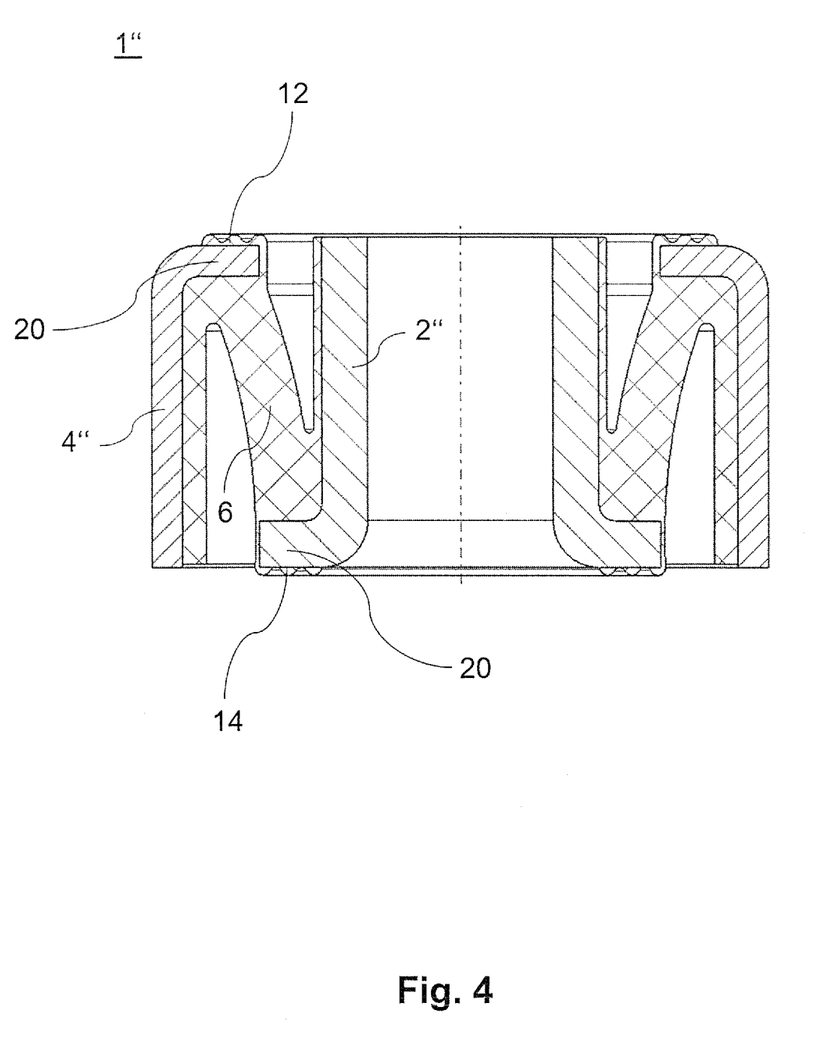
FIG. 4 is a view of a thrust bearing from a bearing housing in a third embodiment.

FIG. 4 shows a sectional view of a thrust bearing 1" according to a third embodiment. It differs from the first and the second embodiments in that the thrust bearing 1" according to the third design form, has a support edge 20 on the outer sleeve 4" as well as a support edge 20 in the inner sleeve 2".

The support edges 20 can be designed somewhat vertically to the outer sleeve 4" as well as to the inner sleeve 2" permitted section. The support edge 20 from the outer sleeve 4" and the support edge 20 of the inner sleeve 2" are designed on the opposite axial ends of the thrust bearing 1". Die outer sleeve sealing area 12 and the inner sleeve sealing area 14 are designed through the respective axial outer faces of the respective support edges 20. For improved sealing, elastomer material could be provided for the outer sleeve sealing area 12 and/or the inner sleeve sealing area 14, whereby this elastomer material could be designed in connection with the elastomer body 6. Through the provision of the inner sleeve sealing surface 14 on the lower axial end of the inner sleeve 2" the sealing ring apparatus and the O-ring may be omitted, which would result in lowering the costs.

What is claimed is:

1. A thrust bearing for a compressed air shock absorber, comprising:
    an inner sleeve;
    an outer sleeve; and
    an elastomer body connected to the inner sleeve and the outer sleeve and ending in a compressed air chamber of the air shock absorber, wherein the elastomer body is a conical spring that extends between an inner sleeve connection area from the inner sleeve and an outer sleeve connection area from the outer sleeve, and wherein at least one of the inner sleeve and the outer sleeve near an axial end section of the inner sleeve connection area and the outer sleeve connection area, respectively, has a radial projecting support edge for bracing of the elastomer body in the axial direction.

2. A compressed air shock absorber comprising:
    an air spring at least partly confined to an air spring compartment;
    a damper head mounting configured to seal the air spring compartment from the environment; and
    a damper unit including a damping rod, wherein the air spring compartment has a thrust bearing in accordance with claim 1, and wherein the damping rod protrudes through the inner sleeve of the thrust bearing.

3. A compressed air shock absorber in accordance with claim 2, wherein the support projection is generally circumferential to at least one of the inner sleeve and the outer sleeve.

4. A compressed air shock absorber in accordance with claim 2, wherein the support projection is in an upper axial abutment with one of the inner sleeve connection area and the outer sleeve connection area.

5. A compressed air shock absorber in accordance with claim 2, wherein the support projection is in an axial abutment with one of the inner sleeve and the outer sleeve.

6. A compressed air shock absorber in accordance with claim 2, wherein the elastomer body is a conical spring that is wider on top, towards the back and, thereby, the support projection is designed on an upper axial abutment of the outer sleeve.

7. A thrust bearing in accordance with claim 1, wherein the support projection is generally circumferential, to at least one of the inner sleeve and the outer sleeve.

8. A thrust bearing in accordance with claim 7, wherein the support projection is designed on an upper axial abutment with one of the inner sleeve connection area and the outer sleeve connection area.

9. A thrust bearing in accordance with claim 1, wherein the support projection is in an upper axial abutment with one of the inner sleeve connection area and the outer sleeve connection area.

10. A thrust bearing in accordance with claim 1, wherein the support projection is in an axial abutment with one of the inner sleeve and the outer sleeve.

11. A thrust bearing in accordance with claim 1, wherein the elastomer body is a conical spring that is wider on top, towards the back and, thereby, the support projection is designed on an upper axial abutment of the outer sleeve.

12. A thrust bearing in accordance with claim 1, having a radial rigidity between approximately 10 N/mm to 100 N/mm.

13. A thrust bearing in accordance with claim 1, wherein a radial projection amount (RAV) of the support projection amounts to between approximately $1/3$ to approximately $3/5$ of a radial gap (RIHAH) between the inner sleeve and the outer sleeve.

14. A thrust bearing in accordance with claim 1, wherein a material thickness of at least one of the inner sleeve and the outer sleeve amounts to approximately $1/5$ and $1/3$ of a difference between an inner radius of the inner sleeve and an outer radius of the outer sleeve.

15. A thrust bearing in accordance with claim 1, wherein an area of the inner sleeve connection area is approximately the same as an area of the outer sleeve connection area.

16. A thrust bearing in accordance with claim 1, wherein at least one of the inner sleeve and the outer sleeve includes a sealing lip on an axial front face of at least one of the inner sleeve and the outer sleeve.

17. A thrust bearing in accordance with claim 1, having a radial rigidity between approximately 30 N/mm and 60 N/mm.

18. A thrust bearing in accordance with claim 1, wherein a radial projection amount (RAV) of the support projection amounts to between approximately half of a radial gap (RIHAH) between the inner sleeve and the outer sleeve.

19. A thrust bearing in accordance with claim 1, wherein a material thickness of at least one of the inner sleeve and the outer sleeve amounts to approximately $1/4$ of a difference between an inner radius of the inner sleeve and an outer radius of the outer sleeve.

20. A thrust bearing in accordance with claim 1, wherein the elastomer body surrounds an end of the support projection.

\* \* \* \* \*